US009124564B2

(12) United States Patent
Kandasamy et al.

(10) Patent No.: US 9,124,564 B2
(45) Date of Patent: Sep. 1, 2015

(54) CONTEXT AWARENESS DURING FIRST NEGOTIATION OF SECURE KEY EXCHANGE

(71) Applicant: Cisco Technology, Inc., San Jose, CA (US)

(72) Inventors: Thamilarasu Kandasamy, Bangalore (IN); Ly Loi, Los Altos, CA (US); Rajeshwar Singh Jenwar, Uttar Pradesh (IN)

(73) Assignee: Cisco Technology, Inc., San Jose, CA (US)

( * ) Notice: Subject to any disclaimer, the term of this patent is extended or adjusted under 35 U.S.C. 154(b) by 54 days.

(21) Appl. No.: 13/973,109

(22) Filed: Aug. 22, 2013

(65) Prior Publication Data

US 2015/0058913 A1 Feb. 26, 2015

(51) Int. Cl.
*H04L 29/06* (2006.01)
*H04L 9/14* (2006.01)

(52) U.S. Cl.
CPC ............ *H04L 63/061* (2013.01); *H04L 9/14* (2013.01); *H04L 63/20* (2013.01)

(58) Field of Classification Search
CPC ....... H04L 63/20; H04L 63/102; H04L 63/08; H04L 63/10; H04L 63/0272; H04L 12/4641; G06F 21/6218; G06F 21/31; G06F 2221/2141; G06F 21/10; G11B 20/00086
USPC .......................................................... 380/278
See application file for complete search history.

(56) References Cited

U.S. PATENT DOCUMENTS

| 7,373,660 | B1 | 5/2008 | Guichard et al. | |
|---|---|---|---|---|
| 7,533,265 | B2 * | 5/2009 | Ballinger et al. | 713/172 |
| 7,620,810 | B2 * | 11/2009 | Vaarala et al. | 713/161 |
| 7,949,766 | B2 | 5/2011 | Bakke et al. | |
| 8,261,318 | B2 | 9/2012 | Huang et al. | |
| 2002/0097724 | A1 * | 7/2002 | Halme et al. | 370/392 |
| 2005/0216729 | A1 * | 9/2005 | Joels et al. | 713/153 |
| 2012/0071168 | A1 * | 3/2012 | Tomici et al. | 455/445 |
| 2013/0074176 | A1 * | 3/2013 | Nishihata et al. | 726/15 |
| 2014/0141714 | A1 * | 5/2014 | Ghosh et al. | 455/39 |

OTHER PUBLICATIONS

Kaufman, "Internet Key Exchange Protocol Version 2 (IKEv2)," Internet Engineering Task Force (IETF), Request for Comments : 5996, Standards Track, Sep. 2010, pp. 1-138.
Kaufman, "Internet Key Exchange (IKEv2) Protocol," The Internet Society, Network Working Group, RFC 4306, Standards Track, Dec. 2005, 99 pages.

* cited by examiner

*Primary Examiner* — Harunur Rashid
*Assistant Examiner* — Sakinah W Taylor
(74) *Attorney, Agent, or Firm* — Edell, Shapiro & Finnan, LLC

(57) ABSTRACT

Techniques are presented for establishing context awareness during first negotiation of secure key exchange. These techniques may be embodied as a method, apparatus or instructions in a computer-readable storage media. At a first network device, a message is received from a second network device as part of an initial exchange of information of a secure key exchange, the message containing information indicating one or more secure key exchange policies acceptable to the second network device and defining one or more associated security parameters. The message further contains context-specific information identifying a context of the second network device. The first network device selects a secure key exchange policy for communicating with the second network device based upon the context-specific information and sends a response message to the second network device containing the selected secure key exchange policy. If the context was understood, the response message also includes context-specific information.

20 Claims, 7 Drawing Sheets

US 9,124,564 B2

CONTEXT AWARENESS DURING FIRST NEGOTIATION OF SECURE KEY EXCHANGE

TECHNICAL FIELD

The present disclosure relates to establishing secure Internet Protocol Security (IPsec) sessions, and to allowing such sessions to be context aware during first negotiation.

BACKGROUND

In cloud-based environments, resources are frequently shared between multiple clients, creating a multi-tenant environment. As each client has the capacity to create and establish one or more security policies for negotiating access into cloud-based environments, it is important to ensure that individual policies are respected, and in particular, that conflicts between policies do not occur.

During establishment of an IPsec session, an initiator and a responder exchange a series of messages in order to negotiate selection of various security parameters and perform authentication. In protocols such as Internet Key Exchange (IKE) or Internet Key Exchange version 2 (IKEv2), security parameters are selected during first exchange of messages. However, the identity of the initiator is not known by the responder during this first exchange, and therefore, the proper security policy may not be selected by the responder.

DESCRIPTION OF EXAMPLE EMBODIMENTS

Overview

Techniques are presented for establishing context awareness during first negotiation of secure key exchange. These techniques may be embodied as a method, apparatus or instructions in a computer-readable storage media. At a first network device, a message is received from a second network device as part of an initial exchange of information of a secure key exchange, the message containing information indicating one or more secure key exchange policies acceptable to the second network device and defining one or more associated security parameters. The message further contains context-specific information identifying a context of the second network device. The first network device selects a secure key exchange policy for communicating with the second network device based upon the context-specific information and sends a response message to the second network device as part of the initial exchange of information of the secure key exchange. The response message contains the selected secure key exchange policy, and if the context was understood, the response message also includes context-specific information.

Example Embodiments

IPsec is a protocol suite for securing (Internet Protocol) IP communications by encrypting IP packets of a data stream. IPsec uses the IKE/IKEv2 protocol to set up a security association by handling negotiation of protocols and algorithms used to generate encryption and authentication keys for IPsec communications. IPsec uses the Encapsulating Security Payload (ESP) protocol to provide authentication and confidentiality for IP packets. Thus, IPsec can be used to secure upper layer communications, e.g., user datagram protocol (UDP) over IPsec, or Transport Control Protocol (TCP) over IPsec, and application-to-application communications like Java Message Service.

Cloud Service Providers (CSPs) providing Virtual Private Networks (VPNs) as a service may share infrastructure among two or more clients, and provide Web Application Programming Interfaces (APIs) that enable clients to define their own IKE Proposal/Policy on IKE endpoints.

Figure 1:
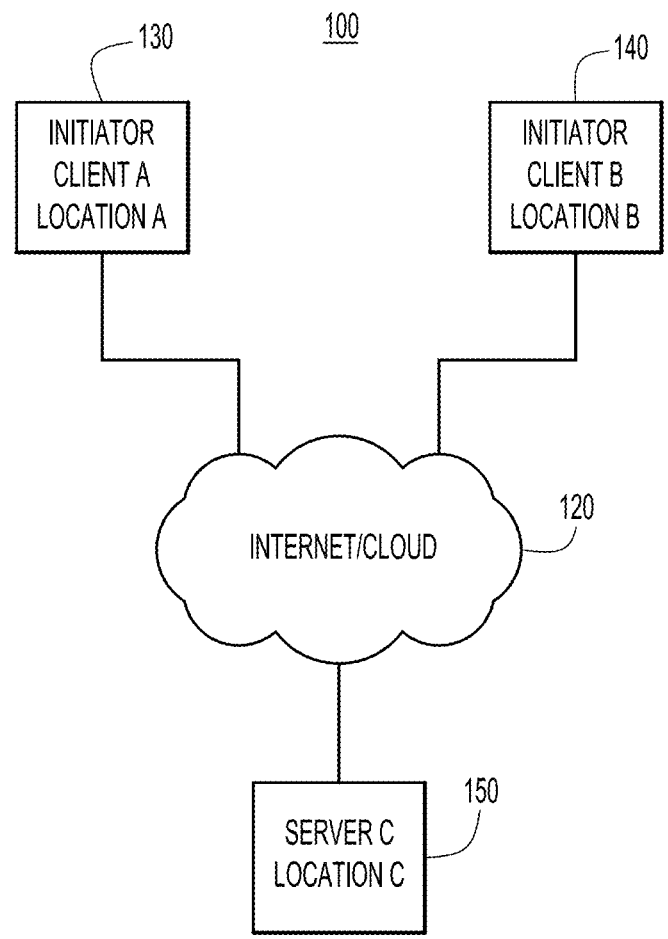
FIG. 1 illustrates an example multi-tenant network topology (e.g. having multiple clients/initiators) suitable for implementation of the techniques disclosed herein.

FIG. 1 illustrates an example network topology 100 suitable for implementing the techniques described herein. For example, as shown in FIG. 1, clients 130, 140 in different geographic locations (locations A and B, respectively) may wish to communicate with server C 150 at location C using different security policies. FIG. 1 shows an Internet/cloud environment 120 offering shared infrastructure to multiple clients/initiators. In this example, two clients, client A 130 and client B 140 are shown as initiating a secure key exchange in order to establish a connection with server C 150. Thus, the architecture of the Internet/cloud environment 120 supports a multi-tenant, also known as multi-client, environment. It is expressly understood that there are many other network topologies which may be suitable for implementation of the techniques disclosed herein, and the example of FIG. 1 is not meant to be limiting with regard to network topology. The techniques disclosed herein apply to any network having two IKE endpoints. In general, an IKE endpoint comprises a network device capable of acting as an initiator or as a responder.

With regard to typical IKE/IKEv2 protocols, neither the initiator nor the responder is aware of the multi-tenancy nature of the environment, and therefore, a policy created by client A 130 may conflict with a policy created by client B 140, thereby impacting the characteristics of IKE sessions for each client. For example, client A 130 may opt for cipher Advanced Encryption Standard 256 (AES256) and client B 140 may opt for Triple Data Encryption Standard (3DES or Triple DES); however, during establishment of an IKE session for client A 130, 3DES may be selected by a responder.

As previously discussed, although the IKE/IKEv2 protocol has provisions for exchanging identity, identity exchange does not occur during the first exchange (denoted IKE_SA_INIT). Instead, identity exchange occurs during a subsequent exchange of messages, i.e., during security association-authentication (denoted IKE_SA_AUTH), after selection of certain security parameters, such as a cryptographic algorithm, has already occurred. In other words, selection of a cryptographic algorithm occurs during IKE_SA_INIT, prior to identity exchange.

In a multi-tenant environment, different policies may be established for different tenants based upon a variety of context associated-information, such as corporate identity, geographic location, and application. Accordingly, it is important to provide a mechanism to enable a particular tenant or client to be authenticated with their proper established policy, and ensure that conflicts or overlaps do not occur with other tenants that have access to different resources and different established policies. Because the IKE/IKEv2 protocol does not have the ability to enforce proposal/policy validation during initial exchange of information (IKE_SA_INIT), a modification/extension is proposed as part of a secure key exchange, which adds context-specific data to information provided to a responder as part of an incoming negotiation. This modification ensures that, as negotiation proceeds, the responder is aware of the allowable policies for a particular tenant, and a correct policy is chosen as part of the negotiation process. Thus, adding context awareness to the protocol ensures that client-specific policies, location-specific policies, or application-specific policies can be enforced during initial exchange of information (IKE_SA_INIT).

IKE and IKEv2 protocols are described in, e.g., Request for Comments RFC2409 and RFC5996.

Figure 2A:
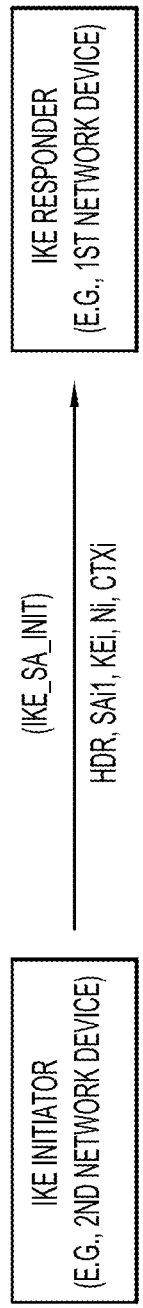
FIG. 2A shows, as part of an IKE initial exchange having context awareness, a message sent from initiator to responder, according to the techniques disclosed herein.
Figure 2B:
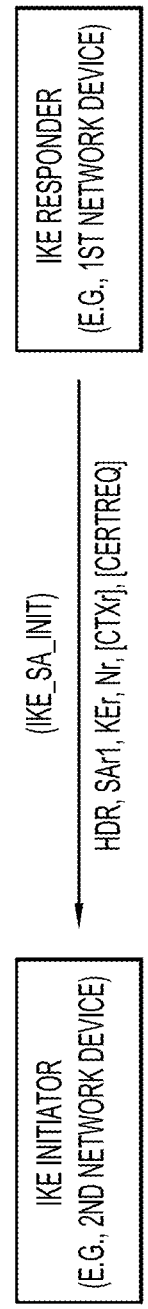
FIG. 2B shows, as part of an IKE initial exchange having context awareness, a message sent from responder to initiator, according to the techniques disclosed herein.

FIGS. 2A and 2B show individual parameters involved in an IKE_SA_INIT exchange of information according to the techniques disclosed herein.

As seen from FIGS. 2A and 2B, during the modified message exchange, the IKE protocol has been extended to include a context-specific parameter CTX: CTXi contains context-specific information as part of the initial request, and CTXr contains context-specific information as part of the initial response. More specifically, CTXi contains context-specific information associated with the initiator, and CTXr is included in the response, in the event that the context is understood by the responder.

An IKE proposal is a set of algorithms that two peers (e.g., an initiator and a responder) may use to establish a secure connection. IKE negotiation begins with each peer agreeing upon a common (shared) IKE policy. This policy states which security parameters will be used to establish a secure channel.

To define an IKE proposal, an encryption method for IKE negotiation is specified to protect data and ensure privacy; a Diffie-Hellman group is specified to determine the strength of the encryption-key-determination algorithm as well as to derive encryption and hash keys. An authentication method is used to ensure the identity of the peers.

As discussed previously, IKE performs mutual authentication between two parties and establishes an IKE security association. During IKE/IKEv2 communication, an initiator sends a message to a responder, and the responder evaluates the request and sends a response to the initiator. This pair of messages, the request and the response, is collectively known as an "exchange". The first exchange is referred to as IKE_SA_INIT and the second exchange is referred to as IKE_SA_AUTH. The second set of exchanges contains a pair of messages, a request and a response, to complete authentication (IKE_SA_AUTH). During this step, client identities are exchanged, peer authentication is performed, and a security association is set up. A modified IKE_SA_INIT exchange is discussed in more detail below.

According to the techniques presented herein, the initial exchange of messages during IKE_SA_INIT is modified to allow the responder to become context aware during first negotiation. During the first exchange of a modified IKE session (modified IKE_SA_INIT), security parameter negotiation occurs. Referring to FIG. 2A, an initiator sends a request message that includes a set of parameters (HDR, SAi1, KEi, Ni and CTXi) to the responder. The HDR header contains the Security Parameter Indexes (SPIs), version numbers, as well as various flags. The SAi1 payload states the cryptographic algorithms acceptable to the initiator. The KEi payload and the Ni payload include, respectively, a Diffie-Hellman value and a random number, provided by the initiator. CTXi includes context-specific information from the initiator. IKE allows for defining data types within protocols, such as CTX. Supported IKE data types also include reserved types, private types, etc.

As shown in FIG. 2B, the responder selects a cryptographic suite from the initiator's offered choices, and sends a reply message that includes a set of parameters (HDR, SAr1, KEr, Nr, [CTXr] and [CERTREQ]). The HDR header contains SPIs, version numbers, and flags. The SAr1 parameter contains the selected cryptographic suite. The KEr payload completes the Diffie-Hellman exchange, and Nr returns a nonce payload. CTXr returns context-specific information only if the context is understood by the responder. CERTREQ optionally returns a certificate payload for authentication.

As shown by this exchange, security parameters are negotiated during IKE_SA_INIT, one of which is a particular cryptographic algorithm. Modification of the IKE_SA_INIT to include a context-specific parameter CTX provides visibility regarding the identity of the client, at the responder end, during the initial negotiation phase. Therefore, in a multi-tenant environment, in which different protocols have been established by different clients, the responder will have the capability during IKE_SA_INIT to identify the client or the particular requirements of the client, and to ensure that negotiation proceeds according to the policies established by the client.

In one approach, when IKE negotiation begins, the second network device that initiates the negotiation may send one or more acceptable policies to the first network device (usually peer-to-peer), and the first network device searches for a match with its own policies. The policies of the second network device may be provided in priority order, to indicate preferred policies. As an example of a compatible security policy between an initiator and a responder, both policies would have the same encryption, hash, authentication, and Diffie-Hellman parameter values. If a match is not found, negotiation is typically refused and an IKE secure association is not established.

Different encryption algorithms include Data Encryption Standard (DES), a symmetric secret-key block algorithm; 3DES or Triple DES, an algorithm that processes each block of data using DES three times, each time with a different key; and AES, an algorithm that provides greater security than DES and is computationally more efficient than 3DES, as well as offers three different key strengths: 128-, 192- and 256-bit keys.

Importantly, the cryptographic suite chosen by the responder is determined by the CTXi provided in the IKE_SA_INIT message from the initiator. If the responder (e.g., gateway) is a shared resource (e.g., cloud environment with multiple tenants), the responder will select the cryptographic suite associated with the context-specific information CTXi provided from the initiator.

The context ID type and context ID payload data is unique to an initiator (e.g., client) and responder (e.g., gateway) that creates an IKE/IKEv2 proposal and policy on IKE/IKEv2 endpoints. When the responder processes the IKE_SA_INIT request, the responder evaluates the incoming request against the proposal/policy associated with the same context. When an IKE/IKEv2 request is initiated, the context ID payload data and context ID type are included in the IKE_SA_INIT request as a payload. When the responder processes the IKE_SA_INIT request, the responder evaluates the incoming request against the proposal/policy associated with the same context as that of the IKE_SA_INIT request. In particular, the context ID type and context ID payload data is part of a global IKE/IKEv2 policy which is applicable for all incoming requests. The context ID type and context ID payload data from the initiator is used to filter and select one or more appropriate IKE/IKEv2 policies on the responder. If the context is matched, IKE/IKEv2 policy as per context is selected and normal processing of IKE_SA_INIT continues, with acceptable context-specific information included as part of the context ID payload of the IKE_SA_INIT response. If the context is not matched on the responder as per configured policy, normal IKE/IKEv2 policy selection happens and context-specific information is not included in the IKE_SA_INIT response.

The responder has a set of rules to process context-specific information and to make decisions regarding selection of a security policy. Upon receipt of context-specific information from the initiator, the responder will store the context-specific information, and apply a set of rules to match the context of the received information with an appropriate policy of the responder, ensuring that an acceptable policy is selected. In another approach, the context-specific information may be used to filter a group of secure key exchange policies of the responder into a subset of policies, which all may be acceptable to the initiator.

Prior to first exchange of messages, the responder may also be pre-configured with context-specific information, including one or more of the following: location of initiator, location of responder, customer name, customer ID, application name and application ID. The pre-configured information stored at the responder may be used in matching the context of the received information from the initiator with one or more appropriate policies of the responder.

This modification of the IKE protocol ensures isolation between configurations for different tenants. Upon receiving a request with context-specific information, the responder stores this information, and therefore, is now aware that a policy needs to be selected based upon the provided context-specific information.

If the responder understands the context-specific information provided by the initiator, the same context-specific information is sent back to the initiator in the response message, as shown in FIG. 2B. The inclusion of this information indicates to the initiator that the context was understood by the responder and that the responder is capable of processing the context specific information. In this scenario, the next stage of IKE authentication will proceed.

Importantly, in the event that the responder does not understand the context-specific information (e.g., is not capable of processing context-specific information, is unaware of the context-specific information, or is unable to find a matching context), context-specific information will not be included in the reply. Importantly, the absence of context-specific information in the response indicates to the initiator that the context was not understood. The initiator may choose to proceed further with the negotiation, or alternatively, may send out a teardown message to release reserved resources involved in establishing a secure session. If the context is not understood, the responder (e.g., gateway) may select a secure key exchange policy, and the initiator (e.g., client) determines whether to drop the connection or accept the policy and proceed with authentication. Thus, by including context-specific information in the response message from the first network device to the second network device, an indication is provided that the selected secure key exchange policy was selected in view of the context-specific information provided by the initiator.

Figure 3A:
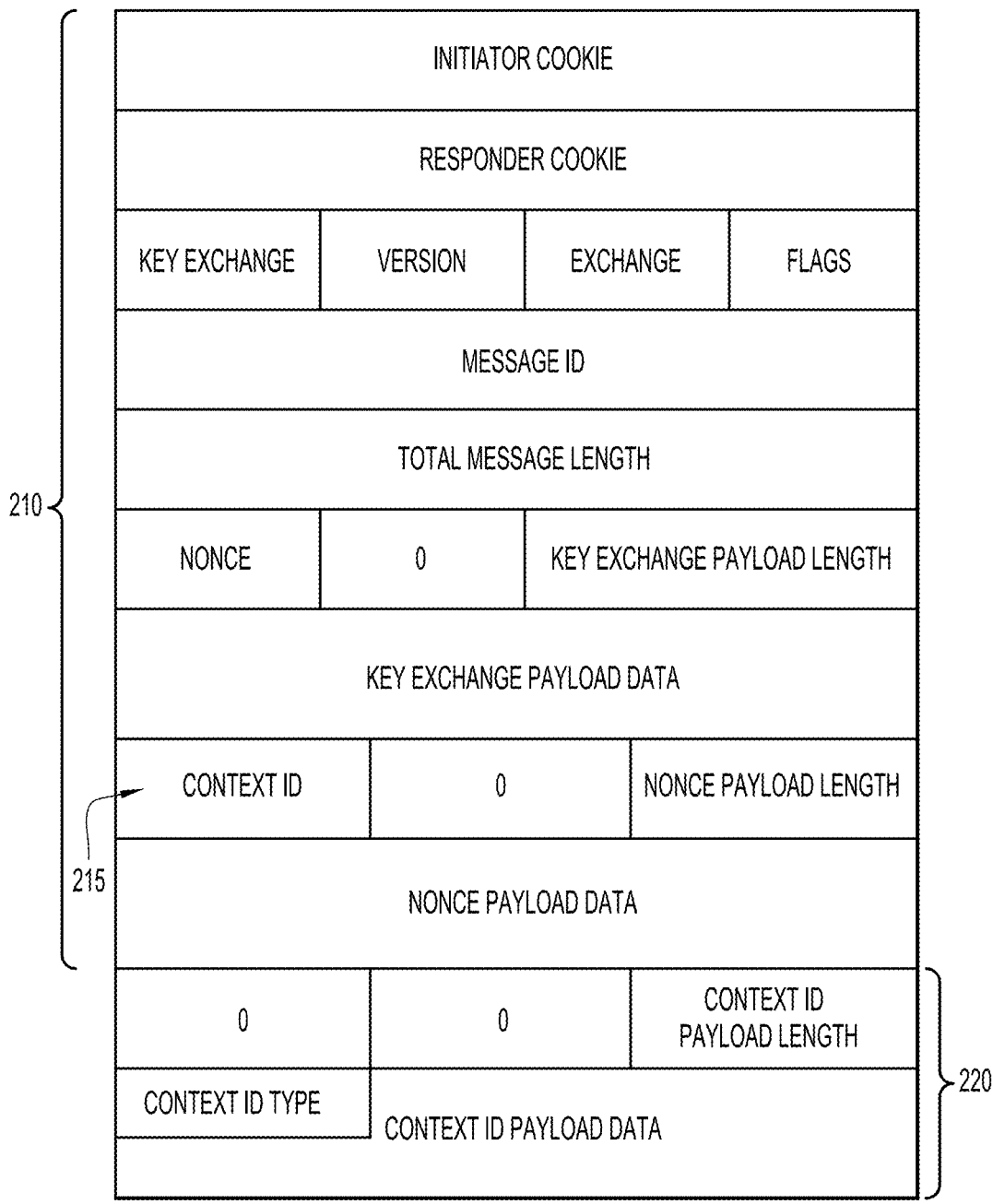
FIG. 3A shows an IKE message format with context-specific information according to the techniques disclosed herein.

FIG. 3A shows the structure of an IKE message format with context ID payload, according to the techniques disclosed herein. The standard IKE format 210 is shown, which includes header information, nonces, and key exchange parameters. Within the standard IKE format 210, "context ID" is listed as a parameter in a 'next payload' field 215, indicating that the following payload contains context-specific information. The context-specific information is provided to the responder as payload 220.

Figure 3B:
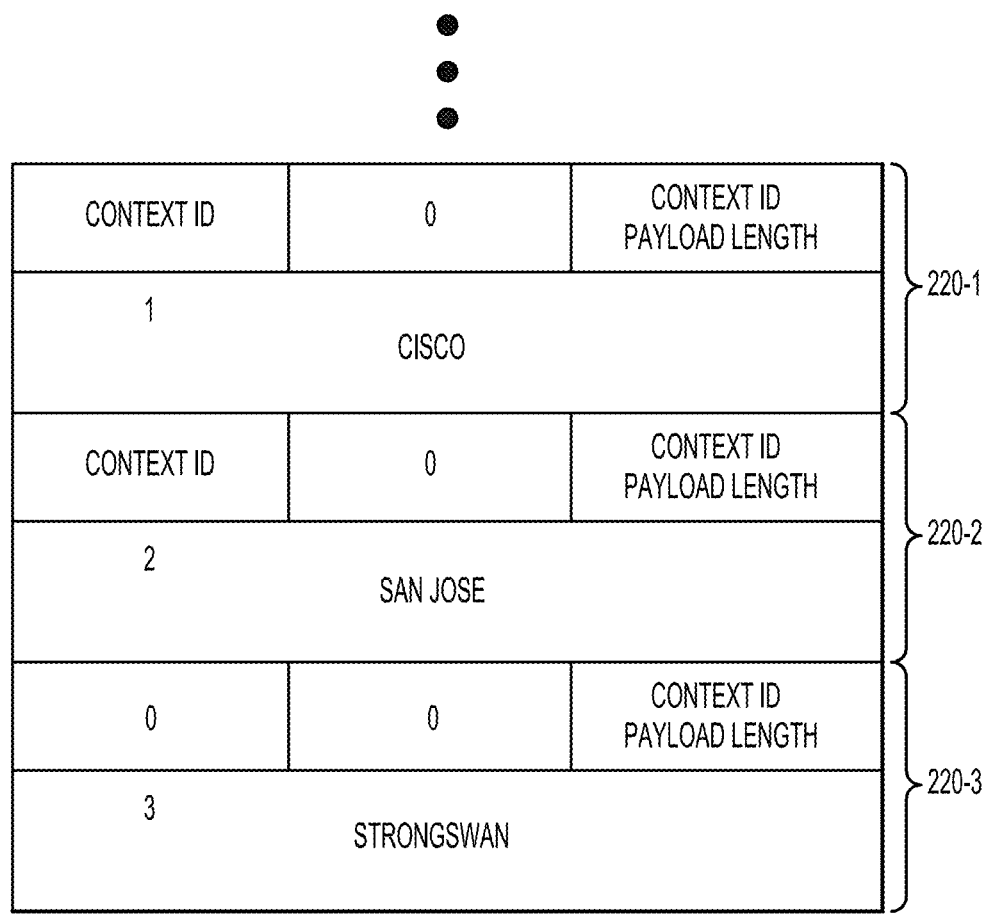
FIG. 3B shows an IKE message format with multiple layers of context-specific information according to the techniques disclosed herein.

FIG. 3B shows multiple types of context-specific information being sent as part of an IKE message. Examples of context ID type may include numeric values, wherein a numeric value of '1' corresponds to a client ID, a numeric value of '2' corresponds to a location, and a numeric value of '3' corresponds to an application ID or solution. Thus, the context-specific information may have a form of a value and an associated value type. Accordingly, the context can be different, based upon a particular use case, as described by the context ID type.

FIG. 3B shows an example of multiple types of context-specific information. For example, payload 220-1 includes a context ID type of '1', indicating context-specific information corresponding to a client ID, and context ID payload data, which is the name of the client, e.g., Cisco. Similarly, payload 220-2 includes a context ID type of '2', indicating context-specific information corresponding to a location, and context ID payload data that is the name of the location, such as San Jose. Likewise, payload 220-3 includes a context ID type of '3', indicating context-specific information corresponding to an application or solution, and context ID payload data that is the name of the application or solution, such as strongSwan. Thus, for this example, the one or more context ID types identify for each value whether the value is a physical location, a customer identifier or an application identifier.

As shown in FIG. 3B, multiple context ID's in the payload of the message (e.g., customer ID, location, and solution) may be used to choose a policy or proposal. The context ID payload length, in this example, corresponds to the length of the payload in bytes.

As another example, it may be desirable to employ particular ciphers (e.g., with increasing strength) when accessing resources from a particular geographic location (e.g., a particular country). Application Programming Interfaces (APIs) may allow a client to establish multiple globally accessible policies for a particular client. By including context-specific information, the ability to determine a particular context for a client is realized, and the responder has the ability to select a proper policy.

The examples presented herein are not intended to be limited to a particular type of context information, but include, any type of context information which would assist with determination of one or more secure key exchange policies for a particular client in a multi-tenant environment.

Advantages of the techniques presented herein include inter-operability, that is, being able to exchange and utilize information. Additionally, the techniques presented herein are scalable/extendable to networks with different types of topologies and sizes. Also, the techniques presented herein do not leverage mechanisms involving modifications of routing domains, which may involve time consuming and costly configurations.

Figure 4:
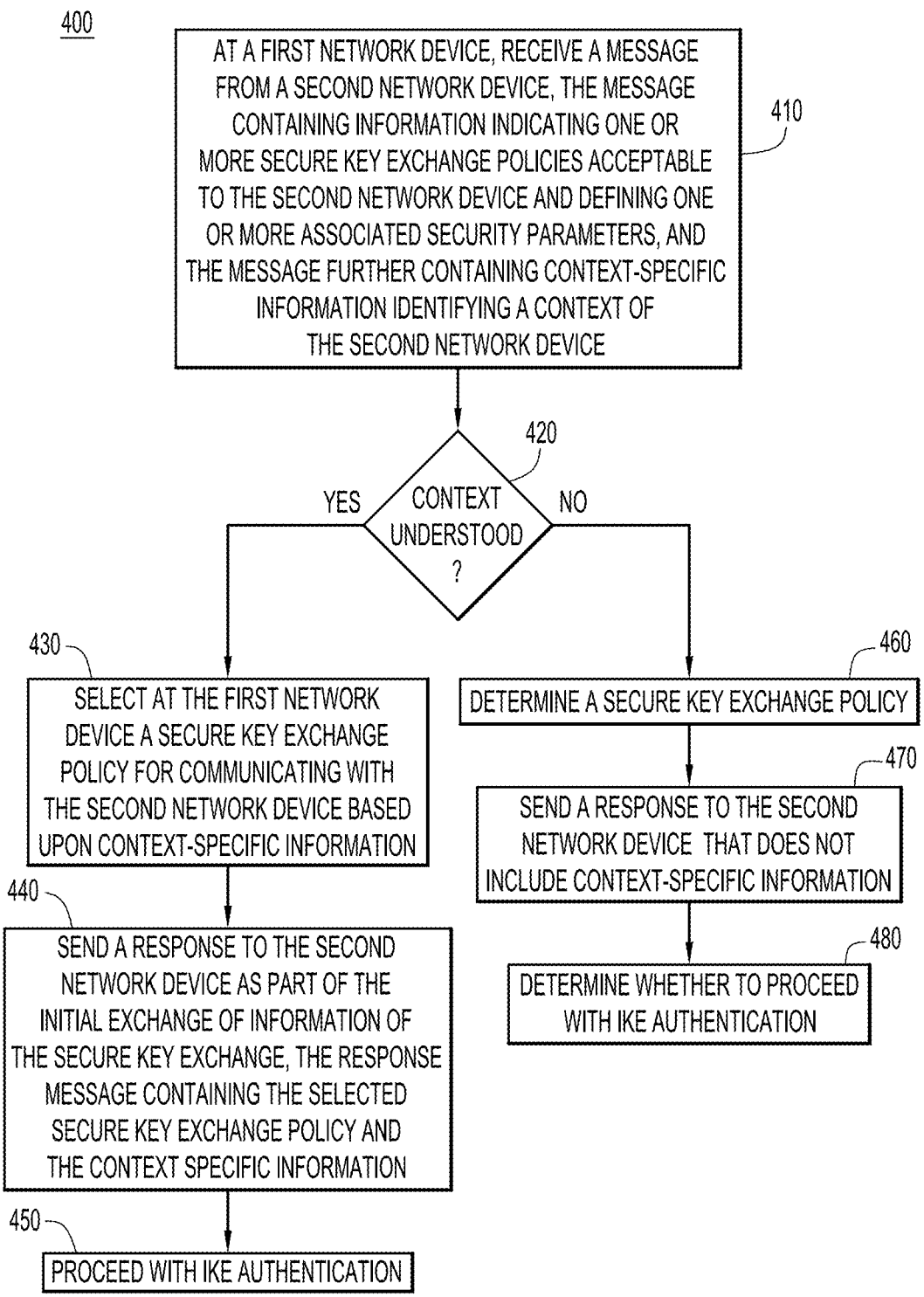
FIG. 4 is a flow chart presenting a secure key exchange policy selection with context awareness according to the techniques disclosed herein.

FIG. 4 is a flow diagram 400 depicting operations according to the techniques disclosed herein. At step 410, a message is received from a second network device as part of an initial exchange of information of a secure key exchange. The message contains information associated with one or more secure key exchange policies of the second network device, as well as context-specific information associated with the second network device, the device initiating the secure key exchange. At step 420, a determination is made as to whether the responder is able to understand the context-specific information. At step 430, the responder selects a correct secure key exchange policy for the network device initiating the secure key exchange, based upon the received context-specific information. At step 440, a response is sent to the initiator from the responder, including the context-specific information in the reply, signaling that the context was understood and that an appropriate policy was selected. At step 450, IKE authentication proceeds, with a subsequent exchange of messages as part of the IKE authentication (IKE_SA_AUTH) phase. At step 460, the context was not understood by the responder. Accordingly, a secure key exchange policy is selected, from among the supported policies by the responder. However, there is no guarantee that a policy commensurate with the requirements of the client has been selected. At step 470, a reply message is sent to the initiator, without the context-specific information, which signals that the context was not understood. At step 480, the initiator determines whether or not to proceed with IKE authentication.

Figure 5:
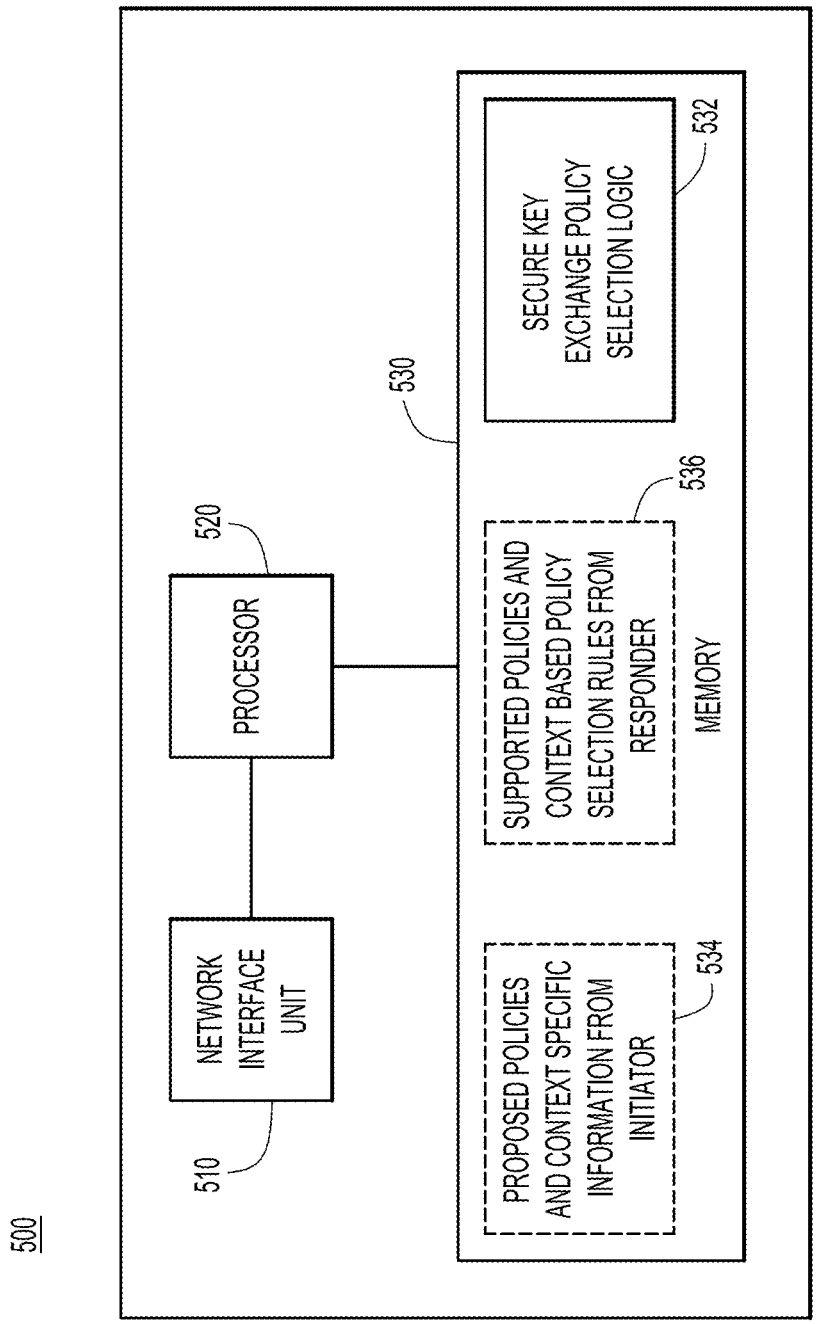
FIG. 5 illustrates an example block diagram of an apparatus configured with context awareness according to the techniques disclosed herein.

FIG. 5 illustrates an example hardware block diagram of a network device 500 configured to perform the techniques disclosed herein. The network device 500 comprises a network interface card or unit 510, a processor 520 and memory 530. The network interface card 510 enables communication over a network on behalf of the device 500. The memory 530 stores instructions for secure key exchange and policy selection logic 532, as well as data for proposed policies and context-specific information 534 and data for supported policies and context based policy selection rules 536.

Memory 530 is one or more computer readable storage media that may comprise read only memory (ROM), random access memory (RAM), magnetic disk storage media devices, optical storage media devices, flash memory devices, electrical, optical, or other physical/tangible memory storage devices. Processor 520 is, for example, a microprocessor or microcontroller that executes instructions for the secure key exchange and policy selection logic 532. Thus, in general, the memory 530 may comprise one or more tangible computer readable storage media (e.g., a memory device) encoded with software comprising computer executable instructions and when the software is executed (by the processor 520) it is operable to perform the operations described herein in connection with secure key exchange and policy selection logic 532. In other approaches, proposed policies and context-specific information 534 from the initiator as well as supported policies and context based policy selection rules 536 from the responder are stored in one or more databases accessible by processor 520.

Figure 6:
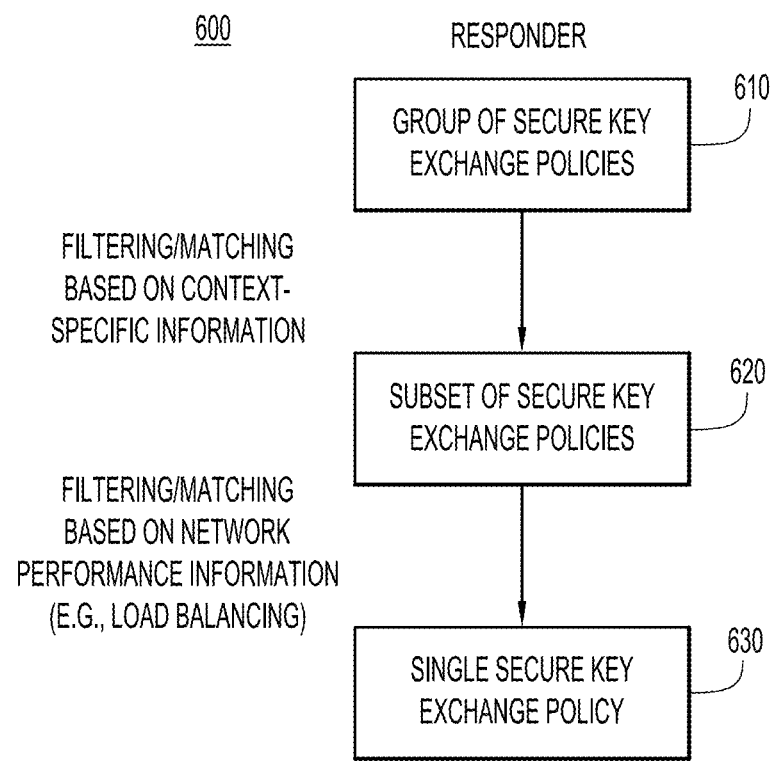
FIG. 6 is a flow chart illustrating another approach in which both context-specific information and performance considerations (e.g., load balancing) may be used to select a secure key exchange policy.

FIG. 6 shows a process in which context-specific information may be combined with additional information to select a security policy. It should be noted that the order of operations in process 600 is interchangeable, or may be combined as part of a single step. For example, step 610 shows a group of secure exchange policies supported by the responder. Context-specific information may be received from the initiator to establish a subset of secure key exchange policies 620 that are all acceptable to the initiator. As different cryptographic algorithms have different costs in terms of computing resources and bandwidth, e.g. cryptographic algorithms with high strength may consume more bandwidth/resources than algorithms of lower strength, the responder may select a policy 630 based upon additional considerations, such as network performance. For instances in which a lower cost algorithm is acceptable to the initiator, the responder may select a less computationally intensive algorithm. Thus, context-specific information may also be used to make load balancing decisions for a network. In particular, context awareness may be particularly helpful in performing load balancing operations with regard to sessions belonging to a particular CSP customer.

Additionally, the techniques presented herein may be applied to a Managed Service Provider (MSP) environment. A MSP environment may have a distributed architecture with multiple modules (line cards), with each module serving one customer (e.g., all Company A employees or all Company B employees). In such scenarios, context awareness may be used to direct an incoming session to the line card configured for the customer.

In summary, a multi-tenant cloud environment, it is important to ensure that policies configured by different customers do not influence each other. While IKE/IKEv2 protocols have provisions for exchanging identity, this exchange of information does not occur during first exchange of messages, at which time certain security parameters are selected. Hence, the IKE/IKEv2 protocol does not have the ability to enforce proposal/policy validation during first exchange of messages. The techniques described herein add context awareness through modification of the IKE/IKEv2 protocol to allow client-specific policies to be enforced during the initiation phase.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

The above description is intended by way of example only. Various modifications and structural changes may be made therein without departing from the scope of the concepts described herein and within the scope and range of equivalents of the claims.

What is claimed is:

1. A method comprising:
at a first network device in a multi-tenant environment, receiving a message from a second network device as part of an initial exchange of information of a secure key exchange prior to authentication, the message containing information indicating one or more secure key exchange policies acceptable to the second network device and defining one or more associated security parameters, and the message further containing context-specific information identifying a context of the second network device including a first parameter corresponding to a type of context and a second parameter corresponding to a value associated with the type of context;

selecting at the first network device a secure key exchange policy for communicating with the second network device based upon the context-specific information; and sending a response message from the first network device to the second network device as part of the initial exchange of information of the secure key exchange, the response message containing the selected secure key exchange policy and including an indication that the selected secure key exchange policy was selected in view of the context-specific information, and wherein the same context-specific information is sent to the second network device as part of the initial exchange of information in response to the context-specific information being understood by the first network device.

2. The method of claim 1, wherein selecting comprises filtering a group of secure key exchange policies of the first network device, based upon one or more context-based policy selection rules and the context-specific information received from the second network device for selection of a secure key exchange policy acceptable to the second network device.

3. The method of claim 1, wherein receiving comprises receiving the message as part of an Internet Key Exchange (IKE) or Internet Key Exchange version 2 (IKEv2) protocol.

4. The method of claim 1, wherein receiving further comprises receiving one or more types of context, each type of context associated with a value and identifying whether the value is a physical location, a customer identifier or an application identifier.

5. The method of claim 1, wherein receiving further comprises receiving one or more values, each value containing information indicating: (i) a physical location associated with the second network device; (ii) a customer identifier associated with the second network device; or (iii) an application identifier associated with the second network device.

6. The method of claim 1, wherein the one or more associated security parameters is a cryptographic algorithm.

7. The method of claim 6, wherein the cryptographic algorithm is Data Encryption Standard (DES) or Advanced Encryption Standard (AES).

8. The method of claim 1, further comprising including the context-specific information into the message in a form of a payload, the payload comprising the first parameter and the second parameter.

9. The method of claim 1, wherein sending further comprises sending a response message not including the context-specific information to the second network device, in response to the context-specific information not being understood by the first network device.

10. The method of claim 1, further comprising:
pre-configuring the first network device with context-specific information prior to the initial exchange of information; and
utilizing the pre-configured information stored at the first network device to match a context of the received message from the second network device with one or more secure key exchange policies of the first network device.

11. The method of claim 1, wherein receiving further comprises receiving a message including two or more types of context and associated values, and wherein the two or more types of context and the associated values are used to select the secure key exchange policy.

12. The method of claim 1, wherein the context-specific information is used in combination with load balancing or networking performance characteristics to select the secure key exchange policy.

13. An apparatus for use in a multi-tenant environment comprising:
a network interface unit configured to enable communications over a network;
a processor coupled to the network interface unit, and configured to:
receive a message from a network device as part of an initial exchange of information of a secure key exchange prior to authentication, the message containing information indicating one or more secure key exchange policies acceptable to the network device and defining one or more associated security parameters, and the message further containing context-specific information identifying a context of the network device including a first parameter corresponding to a type of context and a second parameter corresponding to a value associated with the type of context;
select a secure key exchange policy for communicating with the network device based upon the context-specific information; and
send a response message to the network device as part of the initial exchange of information of the secure key exchange, the response message containing the selected secure key exchange policy and including an indication that the selected secure key exchange policy was selected in view of the context-specific information, and wherein the same context-specific information is sent to the network device as part of the initial exchange of information in response to the context-specific information being understood by the apparatus.

14. The apparatus of claim 13, wherein the processor is further configured to filter a group of secure key exchange policies, based upon one or more context-based policy selection rules and the context-specific information received from the network device for selection of a secure key exchange policy acceptable to the network device.

15. The apparatus of claim 13, wherein the processor is further configured to receive the context-specific information comprising one or more types of context, each type of context associated with a value and identifying whether the value is a physical location, a customer identifier or an application identifier, and one or more values, each value containing information indicating a physical location associated with the network device, a customer identifier associated with the network device, or an application identifier associated with the network device.

16. The apparatus of claim 13, wherein the received message is part of an Internet Key Exchange (IKE) or Internet Key Exchange version 2 (IKEv2) protocol.

17. One or more non-transitory computer-readable storage media encoded with software comprising computer executable instructions and when the software is executed operable to:
receive at a first network device in a multi-tenant environment, a message from a second network device as part of an initial exchange of information of a secure key exchange prior to authentication, the message containing information indicating one or more secure key exchange policies acceptable to the second network device and defining one or more associated security parameters, and the message further containing context-specific information identifying a context of the second network device including a first parameter corresponding to a type of context and a second parameter corresponding to a value associated with the type of context;

select at the first network device a secure key exchange policy for communicating with the second network device based upon the context-specific information; and send a response message from the first network device to the second network device as part of the initial exchange of information of the secure key exchange, the response message containing the selected secure key exchange policy and including an indication that the selected secure key exchange policy was selected in view of the context-specific information, and wherein the same context-specific information is sent to the second network device as part of the initial exchange of information in response to the context-specific information being understood by the first network device.

18. The non-transitory computer-readable media of claim 17, further comprising instructions operable to filter a group of secure key exchange policies of the first network device, based upon one or more context-based policy selection rules and the context-specific information received from the second network device for selection of a secure key exchange policy acceptable to the second network device.

19. The non-transitory computer-readable media of claim 17, wherein the instructions to receive the message further comprise instructions operable to receive the message as part of an Internet Key Exchange (IKE) or Internet Key Exchange version 2 (IKEv2) protocol.

20. The non-transitory computer-readable media of claim 17, wherein the instructions to receive the message further comprise instructions operable to receive the context-specific information comprising one or more types of context, each type of context associated with a value and identifying whether the value is a physical location, a customer identifier or an application identifier, and one or more values, each value containing information indicating a physical location associated with the second network device, a customer identifier associated with the second network device, or an application identifier associated with the second network device.

* * * * *